United States Patent
Ramakrishna et al.

(10) Patent No.: US 9,218,594 B2
(45) Date of Patent: Dec. 22, 2015

(54) SOCIAL NETWORK-ASSISTED ELECTRONIC PAYMENTS

(71) Applicant: International Business Machines Corporation, Armonk, NY (US)

(72) Inventors: Venkatraman Ramakrishna, New Delhi (IN); Apurva Kumar, Uttar Pradesh (IN); Sougata Mukherjea, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/673,029

(22) Filed: Nov. 9, 2012

(65) Prior Publication Data

US 2014/0136352 A1    May 15, 2014

(51) Int. Cl.

| | |
|---|---|
| *G06Q 30/00* | (2012.01) |
| *G06G 1/12* | (2006.01) |
| *G06Q 20/00* | (2012.01) |
| *G06Q 20/10* | (2012.01) |
| *G06Q 20/40* | (2012.01) |
| *G06Q 20/12* | (2012.01) |
| *G06Q 20/20* | (2012.01) |

(52) U.S. Cl.
CPC .............. *G06Q 20/10* (2013.01); *G06Q 20/12* (2013.01); *G06Q 20/405* (2013.01); *G06Q 20/20* (2013.01)

(58) Field of Classification Search
None
See application file for complete search history.

(56) References Cited

U.S. PATENT DOCUMENTS

| | | | |
|---|---|---|---|
| 8,224,727 B2 | 7/2012 | Hirson et al. | |
| 8,326,769 B1* | 12/2012 | Weisman | 705/319 |
| 2006/0085259 A1* | 4/2006 | Nicholas et al. | 705/14 |
| 2007/0022048 A1 | 1/2007 | Kingsborough et al. | |
| 2008/0166995 A1* | 7/2008 | Sun et al. | 455/406 |
| 2008/0288277 A1* | 11/2008 | Fasciano | 705/1 |
| 2009/0012895 A1* | 1/2009 | Mehrabi | 705/39 |
| 2009/0094134 A1 | 4/2009 | Toomer et al. | |
| 2009/0119212 A1* | 5/2009 | Liu et al. | 705/44 |
| 2009/0182664 A1* | 7/2009 | Trombley | 705/42 |
| 2010/0125495 A1* | 5/2010 | Smith et al. | 705/14.23 |
| 2010/0306099 A1 | 12/2010 | Hirson et al. | |
| 2010/0312696 A1* | 12/2010 | Sinha et al. | 705/40 |
| 2011/0082766 A1* | 4/2011 | Ko | 705/26.9 |
| 2011/0251922 A1 | 10/2011 | Cavagnaro | |
| 2012/0143761 A1* | 6/2012 | Doran et al. | 705/44 |
| 2012/0158589 A1 | 6/2012 | Katzin et al. | |
| 2012/0203697 A1 | 8/2012 | Morgan et al. | |

(Continued)

OTHER PUBLICATIONS

Understanding Online Donors, FirstGiving Donor Insights 2007-2010 (2010). FirstGiving.*

(Continued)

*Primary Examiner* — Peter L Ludwig
(74) *Attorney, Agent, or Firm* — Ryan, Mason & Lewis, LLP (57) ABSTRACT

Techniques, a system and an article of manufacture for social network-assisted electronic payments. A method includes determining one or more members of a user's social network to query for a financial contribution towards payment of a real-time transaction between the user and a merchant, querying said one or more members in an order based on descending likelihood of member financial contribution until sufficient funds for payment of the transaction are received or all of said one or more members have been queried, and processing a money transfer from the user and/or each of said one or more members to the merchant to complete the real-time transaction.

18 Claims, 4 Drawing Sheets

(56) References Cited

U.S. PATENT DOCUMENTS

2012/0221437 A1     8/2012   Yoo
2012/0253932 A1*   10/2012   Kim et al. .................. 705/14.53
2012/0265678 A1*   10/2012   Ross et al. ...................... 705/42
2013/0132294 A1*   5/2013   Schvey et al. ................. 705/319

OTHER PUBLICATIONS

Method and System for Providing Contribution for a Purchase over a Social Network (Dec. 3, 2010).*
Nonprofits Retained More Donors in 2010, Report Shows (2011). Published by AFP (hereinafter "Retained Donors").*
Google Wallet, http://www.google.com/wallet downloaded Nov. 9, 2012, pp. 1-3.
Square, http://squareup.com downloaded Nov. 9, 2012, pp. 1-3.
Boku, http://www.boku.com downloaded Nov. 9, 2012, pp. 1-4.
Mobile Pay USA, http://www.mobilepayusa.com 2011, pp. 1-3.
Airtel Money, http://www.airtelmoney.in 2012, pp. 1-2.
Mas et al., Designing Mobile Money Services: Lessons from M-PESA, Innovations, 4(2), 77-92, MIT Press, 2009.
PayDivvy, https://www.paydivvy.com 2012, pp. 1-8.
Friend Pay, http://friendgift.com/friendpay downloaded Nov. 9, 2012, pp. 1.
Method and System for Providing Contribution for a Purchase Over a Social Network, IPCOM000202110D dated Dec. 3, 2010.
Kryczka et al., A First Step Towards User Assisted Online Social Networks, SNS'10, Apr. 13, 2010, Paris, France.
Software as a Service: Leveraging Social Relationships in Financial Transactions, IPCOM000176283D dated Nov. 11, 2008.

* cited by examiner

SOCIAL NETWORK-ASSISTED ELECTRONIC PAYMENTS

FIELD OF THE INVENTION

Embodiments of the invention generally relate to information technology, and, more particularly, to electronic payment technology.

BACKGROUND

Approaches are being developed to enable an individual to make payments using his or her mobile phone, either at a Point-of-Sale (PoS) terminal or on the Web. This will potentially preclude individuals from needing to carry around cash or equivalents such as credit and debit cards. Such approaches include vendors storing customers' credit card and bank account information, and allowing users to select a stored payment option when a payment is required. However, in such approaches, PoS terminals may require specialized hardware and software that recognizes the payment protocol, and these approaches do not include awareness of a customer's social network, nor do they provide support for friends or participants in a customer's social network to assist in payment of a real-time transaction.

Accordingly, a need exists to provide a mechanism and/or system that allow a mobile device owner to elicit payment contributions from other individuals, using virtual social network connections, to contribute to a real-time mobile-assisted payment.

SUMMARY

In one aspect of the present invention, techniques for social network-assisted electronic payments are provided. An exemplary computer-implemented method for executing an electronic payment with collaboration from a social network can include steps of determining one or more members of a user's social network to query for a financial contribution towards payment of a real-time transaction between the user and a merchant, querying said one or more members in an order based on descending likelihood of member financial contribution until sufficient funds for payment of the transaction are received or all of said one or more members have been queried, and processing a money transfer from the user and/or each of said one or more members to the merchant to complete the real-time transaction.

In another aspect of the invention, an exemplary computer-implemented method can include steps of identifying a list of members of a user's social network, determining one or more members from the list of members to query for a financial contribution towards payment of a real-time transaction between the user and a merchant, and determining an order in which to contact the one or more members of a user's social network to query for a financial contribution based on each member's likelihood of agreeing to the financial contribution. The method also includes querying said one or more members in said order until sufficient funds for payment of the transaction are received or all of said one or more members have been queried, and processing a money transfer from the user and/or each of said one or more members to the merchant to complete the real-time transaction.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes social network-assisted electronic payments. At least one embodiment of the invention includes providing a mechanism to enable a customer to make a purchase at a Point-of-Sale (PoS) terminal through his or her mobile device with the financial assistance of his or her social network members.

As detailed further herein, at least one embodiment of the invention includes a software agent that mediates a purchase by identifying one or more members of the user's/customer's social network to contact, as well as an order in which to contact those members for the purpose of soliciting payments. The likelihood of a social network member/friend assisting in payment can be determined, for example, dynamically using each member's/friend's availability, presence attributes, financial state (if available), friendship status, and/or past payment history. Further, at least one embodiment of the invention includes subsequently contacting the members/friends in decreasing order of contribution likelihood.

Additionally, at least one embodiment of the invention can include configuring a telecommunication network operator as a mediator to facilitate an entire payment process from the time the payment request was triggered to the time when the merchant (represented, for example, by a Point-of-Sale (PoS) terminal) received a valid payment authorization from an authentic financial provider. Also, completion of a payment can be carried out through an available combination of money transfers, a telecommunication network operator-maintained wallet, and authorizations to withdraw money from financial accounts shared by social network members.

In a typical example scenario, the entities that participate in an online purchase protocol include a customer, who attempts to purchase goods or services, a merchant, who sells goods or services in exchange for payment, and payment providers such as banks and credit card companies. As described herein, at least one example embodiment of the invention presumes the use of a mobile payment mechanism; that is, the payment transaction is performed with a mobile device, and without using physical credit or debit cards. By way of example, the mobile device can include a mobile telephone, a tablet, a laptop computer, etc.

Figure 1:
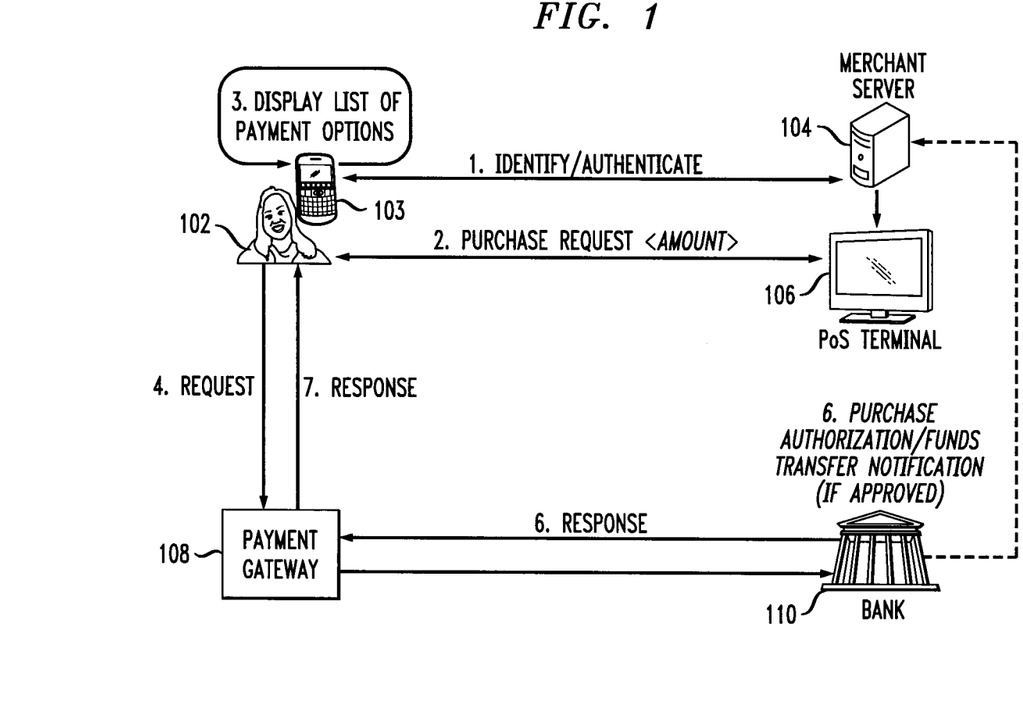
FIG. 1 is a diagram illustrating an example legacy mobile payment protocol.

Payments can be carried out, for instance, through a secure payment gateway protocol such as illustrated in FIG. 1. The protocol is used in purchases made over the Internet and at PoS terminals. In at least one embodiment of the invention, it is assumed that the purchase is being made at a PoS terminal controlled by the merchant.

FIG. 1 is a diagram illustrating an example legacy mobile payment protocol. By way of illustration, FIG. 1 depicts a payment gateway component 108 and a bank 110. Additionally, FIG. 1 also depicts a user or customer 102 (interacting through a mobile device 103, as described herein), and a PoS terminal 106 which is connected to a back-end merchant server 104 that stores data and processes information. It is assumed that the mobile device 103 of the user 102 and the PoS terminal 106 possess one or more mechanisms to identify and authenticate each other. Such mechanisms can be carried out through regular data communication channels, or out-of-band channels that rely on the mobile device 103 and the PoS terminal 106 being in close proximity or having line-of-sight contact. Authentication through regular channels can be carried out using secure wireless communication protocols involving certificates, or through discovery of the merchant's store using localization technology. Out-of-band channels can include infrared communication, radio-frequency identification (RFID) technology, cameras on the phone scanning bar codes or quick response (QR) codes generated on the PoS terminal, etc. Accordingly, the techniques detailed herein in connection with at least one embodiment of the invention operate independent of identification and authentication methods.

As illustrated in FIG. 1, the customer 102, via her mobile device 103, selects goods or services to purchase, and the PoS terminal 106 prepares a purchase order for the set of goods or services. As noted, the customer's mobile device 103 and the PoS terminal 106 identify and authenticate each other, resulting in a purchase request for a certain amount appearing on the mobile device's interface. If the customer 102 elects to make the purchase, her mobile device 103 presents a set of available payment methods on its interface.

The customer 102 selects a purchase option such as, for example, a bank account, a credit card account, or a mobile wallet (provided by a telecom operator). The customer's request can be redirected to the payment gateway 108. In systems involving credit or debit card swiping at a PoS terminal, for example, the PoS terminal is connected to the payment gateway 108. The payment gateway 108 resolves the bank/credit association that holds the customer's account and forwards the request to its payment processor, and the payment processor either approves or rejects the payment request depending on a variety of factors (available balance, suspicious transaction alert, etc.). Also, if the payment processor is hosted by a credit card, the request may again be forwarded to the bank 110 that is backing the account.

The response is redirected along the same chain to the customer's device 103. Additionally, the response, including a payment authorization or fund transfer notification, is sent to the PoS terminal 106, and the protocol is completed.

Figure 2:
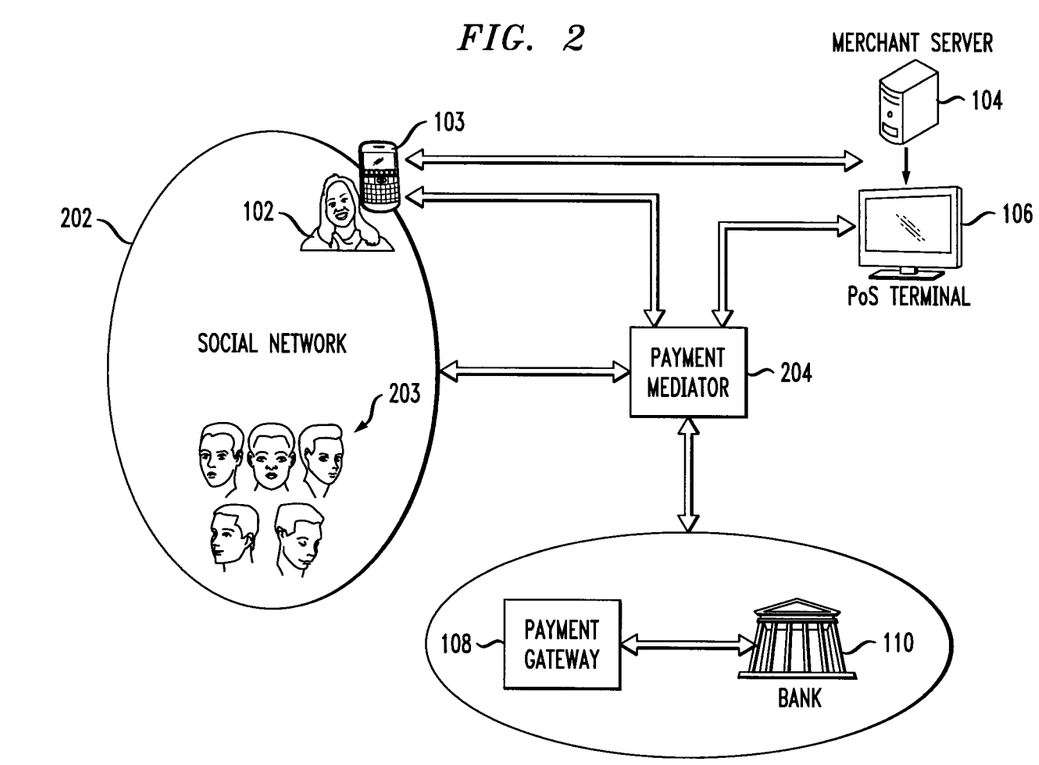
FIG. 2 is a diagram illustrating a mobile payment protocol with a payment mediator and social network, according to an embodiment of the present invention.

FIG. 2 is a diagram illustrating a mobile payment protocol with a payment mediator and social network, according to an embodiment of the present invention. By way of illustration, FIG. 2 depicts similar components as depicted in FIG. 1 with the addition of a payment mediator component 204 as well as a social network 202 of the user 102. As described herein, the payment mediator component 204 is a software agent that is privy to the details of the payment request and to the customer's available payment options.

The nature and placement of the payment mediator component 204 can vary, but its role is generally illustrated in FIG. 2. In at least one embodiment of the invention, a telecommunication network operator that connects the mobile device 103 and the merchant's PoS terminal 106 runs the payment mediation software. In one or more additional embodiments of the invention, the payment mediation component 204 can run as an agent on the customer's mobile device itself, or in a software cloud. In any embodiment, moreover, the payment mediator component 204 is an entity trusted by both the customer's mobile device 103 and by the merchant's PoS terminal 106.

Additionally, as depicted in FIG. 2, an aspect of the invention includes modifying the payment protocol to include a social network payment mechanism option, which leverages the user's social network and participants, members and/or friends 203 therein. This option can be, for example, automatically selected by evaluating a suitable configured policy. Upon selection, the payment mediator component 204 conducts a friend payment request protocol as illustrated in FIG. 3.

Figure 3:
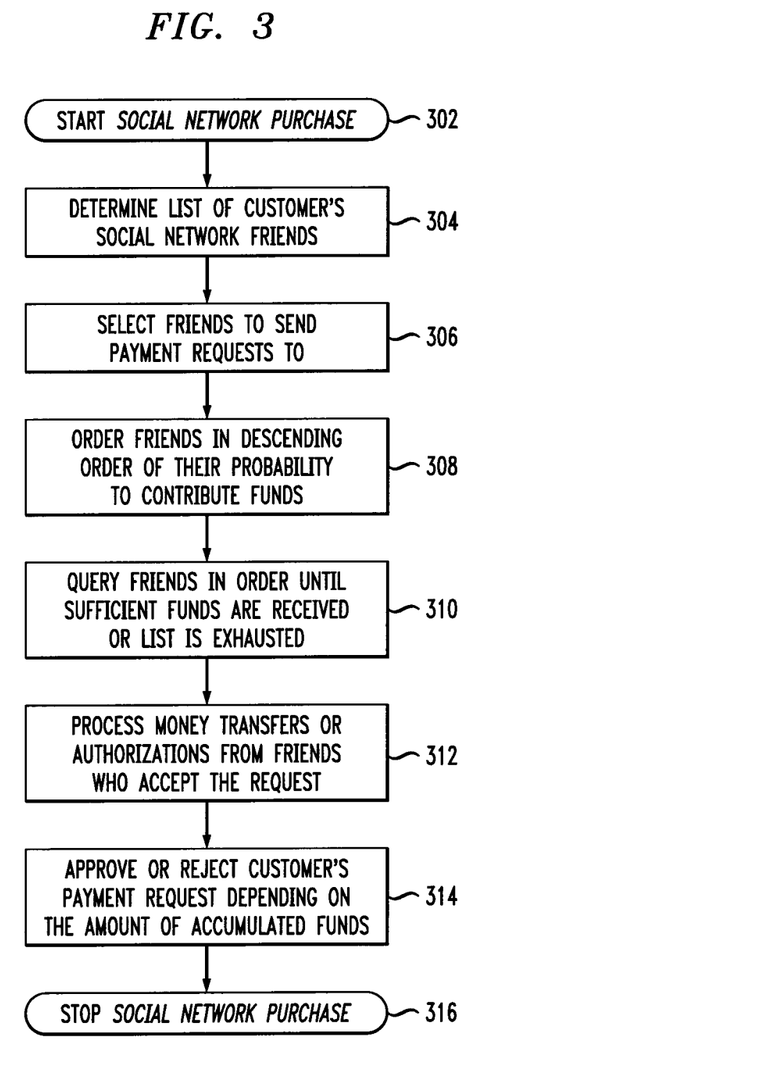
FIG. 3 is a flow diagram illustrating payment mediator functions, according to an embodiment of the present invention.

Accordingly, FIG. 3 is a flow diagram illustrating payment mediator functions, according to an embodiment of the present invention. The protocol begins in step 302, and step 304 includes the mediator determining a list of members 203 in the customer's social network 202. This determination can be carried out in a variety of ways. The customer 102, for example, may choose to reveal the list of his or her social network friends 203 directly to the payment mediator component 204, or do so through a secure application programming interface (API) and protocol supported by the concerned social network. Additionally, for example, a Single Sign-On (SSO) mechanism can be used to gain temporary permissions to access a customer's social network information. This can achieve the objective of keeping the social network friends' participation in the payment hidden from the customer 102, thereby preserving the privacy of those friends or members.

After determining the list of friends, a prioritized subset of the list is selected by the payment mediator component 204 in step 306. These friends, in at least one embodiment of the invention, are selected based on their likelihood of responding positively to the customer's payment request. A variety of criteria can be used to make this selection, and the probability threshold that a member/friend needs to pass to be selected can also vary. Examples of such criteria can include the following.

If it is possible to infer whether a friend is actively receiving incoming messages on his or her mobile device, that friend is likely to be selected. On the other hand, if the friend is offline, he or she will be less likely to be selected. If the telecom operator acts as the payment mediator, this check can be performed in a straightforward manner as the operator can track the presence of its subscribers.

Another criterion can include the financial state of the particular member or friend. This is sensitive information, but if the payment mediator component 204 is acting as a payment proxy for multiple subscribers, it is likely to be privy to relevant information of its subscribers (using delegated permissions). In addition, if a telecom operator is acting as the payment mediator, it may maintain mobile wallets for the members/friends. Using one or more pieces of available knowledge, the payment mediator may determine whether a friend's financial balance is sufficient to allow him or her to respond positively to the original customer's request.

Other criteria can also be used to determine the likelihood that a social network member or friend will make a contribution. The social network communication data could be searched to determine which members or friends the customer 102 interacts with most often, thereby inferring that such a friend is more likely to contribute. On the other hand, a friend with whom a customer rarely or never communicates will be less likely to contribute. Also, for example, a member or friend who lives within the same city (or locality) as the customer 102 may also be more likely to contribute, and therefore may be prioritized by the payment mediator component 204.

Further, for example, the payment mediator component 204 can maintain the history of past payments made upon similar requests and record the willingness of individual social network members to accede to requests. Using such information, a loan network, for example, may be superimposed upon the social network graph, the strength of links indicating the likelihood that a member will give or loan money to another. Under such an embodiment, it is assumed that customer X is more likely to lend money to customer Y in the future if X received money from Y in the past.

Additionally, as depicted in FIG. 3, once the members or friends are selected, they are listed in decreasing order of their probability to contribute or respond positively to the original customer's request in step 308. The friends are then sent request messages in that order, as illustrated in step 310. In one or more embodiments of the invention, multiple friends may be sent simultaneous requests to reduce the total transaction time. For example, the messaging can be carried out via short messaging service (SMS) text messages (with requested response) or unstructured supplementary service data (USSD) messages sent to the friend's mobile device. Alternatively, an automated interactive voice response (IVR) voice call can be made. Further, at least one embodiment of the invention can include a specialized software application that runs continuously on the friend's mobile device, listening for incoming requests of this nature.

Upon receiving such a message, the friend may choose to ignore, reject, or accept the request. If this friend ignores or rejects the request, the next available friend is selected and a message is sent to that person, as noted in step 310. If this (or a subsequent) friend accepts the request, and if he or she has sufficient funds to satisfy the request, the payment is processed according to a protocol as described in herein, as noted in step 312. Accordingly, step 314 includes approving or rejecting the customer's payment request depending on the amount of accumulated funds, and the protocol ends at step 316.

The nature of the social network contribution can vary across different embodiments of the invention. In one example embodiment, the protocol detailed above in connection with FIG. 3 can continue until a single friend who can contribute the requested funds in its entirety is discovered. If no such friend is encountered, the payment protocol ends in failure. In another example embodiment, partial contributions can be accepted from one or more friends. In such a scenario, the protocol ends when the aggregated sum of contributions meets or exceeds the amount originally requested, or if there are no remaining friends to whom to send a request.

Additionally, a social network member or friend may contribute to the original customer 102 in different ways. If both the friend and original customer 102 maintain mobile wallets with the payment mediator component 204, a direct wallet-to-wallet transfer can be carried out. Alternatively, if one of the individuals has a mobile wallet whereas the other individual possesses a bank or credit account, a transfer can be made from the account to the wallet or vice versa. Similar logic applies if both individuals possess bank or credit accounts and neither maintains a mobile wallet.

In another embodiment of the invention, the original customer 102 and the requested friend can hold a joint bank account, and permission is required from both individuals for a successful withdrawal or online purchase. Whatever the nature of the money transfer, the payment mediator component 204, in analyzing the transfer, provides a payment authorization to the merchant at the PoS terminal 106 if the funds obtained through the friend-request protocol are sufficient. If the funds are insufficient, the PoS terminal 106 and the customer's mobile device 103 receive (and display) a failure notification.

Further, at least one embodiment of the invention includes automation through policy configuration. If a payment mediator component 204 is privy to the customer's and friends' financial account information and possesses delegated permissions to transfer funds on behalf of the account owners, explicit request messages to friends' devices can be avoided in the protocol described above. By way of example, such avoidance can be dictated by policy rules. For instance, a friend may authorize any transfer (from either a personal account or an account jointly held with the requestor) less than a given amount for a given set of friends. In a payment session, if the identities of the participants and the requested amount pass the policy filter, a fund transfer or payment authorization can be automatically processed. If the policy check fails, an explicit funds request message can be sent to the friend's mobile device.

As detailed herein, aspects of the invention can be implemented in connection with purchases made at a PoS terminal in a physical store, wherein the payment protocol involves a user carrying a mobile device communicating with the PoS terminal or a server backing that terminal. Additionally, aspects of the invention can also be implemented in connection with virtual PoS terminals used in online stores for purchases made over the Internet. Further, at least one embodiment of the invention is applicable to session- or time-bound purchases.

Figure 4:
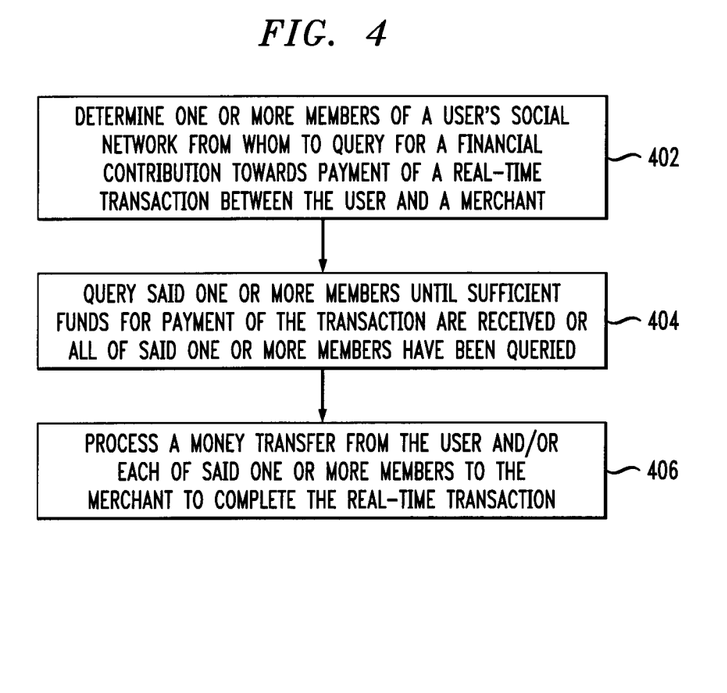
FIG. 4 is a flow diagram illustrating techniques for executing an electronic payment with collaboration from a social network, according to an embodiment of the invention.

FIG. 4 is a flow diagram illustrating techniques for executing an electronic payment with collaboration from a social network, according to an embodiment of the invention. Step 402 includes determining one or more members of a user's social network to query for a financial contribution towards payment of a real-time transaction between the user and a merchant. The real-time transaction, as detailed herein, can include an online payment from a user mobile device to a merchant point-of-sale terminal backed by a server.

Step 404 includes querying said one or more members in an order based on descending likelihood of member financial contribution until sufficient funds for payment of the transaction are received or all of said one or more members have been queried. Step 406 includes processing a money transfer from the user and/or each of said one or more members to the merchant to complete the real-time transaction. The processing step can include automatically processing a payment from a member of the user's social network to the merchant if the queried financial contribution and the identity of the user match a pre-configured member policy.

As also described herein, the processing step can include processing a money transfer from a bank account owned singly by the user and/or each of said one or more members to the merchant. Additionally, processing can include processing a money transfer from a bank account owned jointly by the user and one of said one or more members to the merchant. Further, processing can include processing a money transfer from a subscriber wallet maintained by a telecommunication network operator to the merchant, and/or can also include processing a payment authorization from a credit card company in connection with an account of the user and/or an account of one of said one or more members to the merchant.

The techniques depicted in FIG. 4 can also include obtaining approval of said query for a financial contribution from one of the members of a user's social network. Additionally, the techniques depicted in FIG. 4 can include determining a collection of members of the user's social network. Also, at least one embodiment of the invention includes determining an order in which to contact the members of the user's social network to query for a financial contribution.

Determining an order can include determining a descending order of the one or more members based on each member's likelihood of agreeing to the financial contribution, based on availability of the member to receive a query and/or make a payment, based on a correlation of the member's presence location with the user's presence location, based on a financial state of the member and/or capability of the member to make a financial contribution, based on historical information about at least one past transaction, etc.

The techniques depicted in FIG. 4 can additionally include providing a software agent to mediate the transaction between the user, one or more members of the user's social network, and the merchant. Further, at least one embodiment of the invention includes facilitating a telecommunication network operator providing data communication services to the user via a mobile device and to the merchant to mediate the transaction between the user, one or more members of the user's social network, and the merchant.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 5:
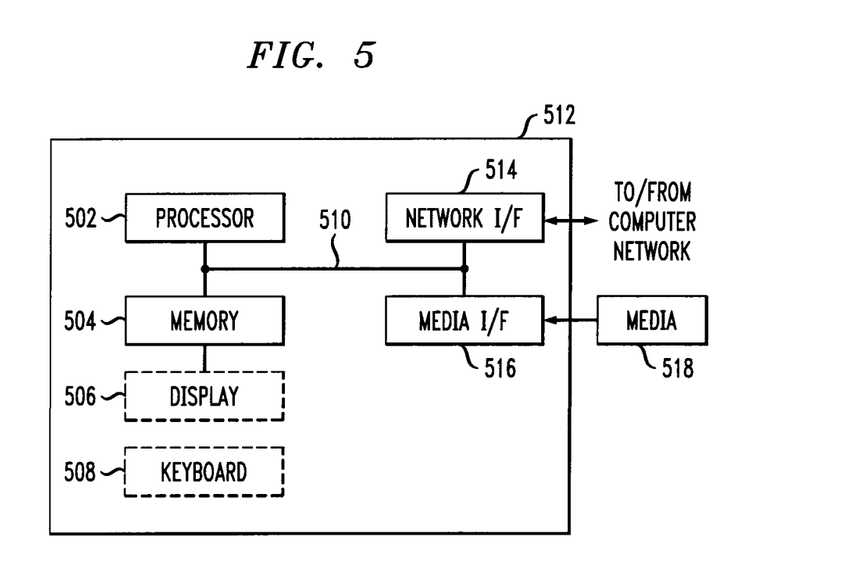
FIG. 5 is a system diagram of an exemplary computer system on which at least one embodiment of the invention can be implemented.

Additionally, an aspect of the present invention can make use of software running on a general purpose computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 508, displays 506, pointing devices, and the like)

can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, enabling a customer to make a purchase at a Point-of-Sale terminal through his or her mobile device with the financial assistance of his or her social network members.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for executing an electronic payment with collaboration from a social network, the method comprising the following steps:
   presenting an interface on a mobile device of a user, upon receiving a real-time transaction order for a good and/or a service from a merchant point-of-sale terminal, a set of multiple payment method options comprising (i) use of a bank account accessed via a first financial institution server, (ii) use of a credit card account accessed via a second financial institution server, and (iii) use of a mobile wallet provided by a telecommunication network operator module;
   in response to a user selection of the payment method option of the use of a mobile wallet provided by the telecommunication network operator module, implementing a payment mediator linked to (i) the mobile device of the user, (ii) the merchant point-of-sale terminal, (iii) the first financial institution server, (iv) the second financial institution server, (v) the telecommunication network operator module, and (vi) a social network server associated with a user's social network, for:
   determining one or more members of the user's social network to query for a financial contribution towards payment of the real-time transaction order between the user and a merchant;
   managing querying of said one or more members (i) in an order based on descending likelihood of member financial contribution above a given threshold and (ii) in accordance with one or more policy configurations attributed to each respective member, wherein said one or more policy configurations comprise (a) querying a given one of said one or more members if an amount of the financial contribution requested is above a predetermined amount and (b) skipping said querying and automatically initiating a money transfer from the given one of said one or more members if the amount of the financial contribution requested is equal to or below the predetermined amount, and wherein said querying comprises querying until sufficient funds for said payment of the transaction are received or all of said one or more members have been queried, and wherein said likelihood of member financial contribution is based on (i) a history of one or more past payments from said one or more members made upon past social network-based queries for the financial contribution towards payment of the real-time transaction between the user and the merchant and (ii) a determination as to whether a financial balance associated with each of said one or more members is sufficient to allow a positive response to said querying; and
   processing a money transfer from the user and/or each of said one or more members to the merchant to complete the real-time transaction, wherein said processing is carried out by the telecommunication network operator module, and wherein:
      said processing comprises configuring the telecommunication network operator module to mediate the money transfer by providing data communication services to (i) the user, (ii) each of said one or more members, (iii) a financial institution associated with each of the user and said one or more members, and (iv) the merchant; and
      the telecommunication network operator module employs multiple mobile wallets to be used as sources for the money transfer, wherein the multiple mobile wallets comprise a mobile wallet associated with the user and a mobile wallet associated with each of said one or more members via:
         identifying the mobile wallet associated with the user and the mobile wallet associated with said one or more members; and
         executing a wallet-to-wallet transfer between the mobile wallet associated with the user and the mobile wallet associated with each of said one or more members;
   wherein each of the steps is carried out by a computer device.

2. The method of claim 1, wherein said real-time transaction between the user and the merchant comprises an online payment from a user mobile device to a merchant point-of-sale terminal backed by a server.

3. The method of claim 1, comprising obtaining approval of said query for said financial contribution from one of said one or more members of said user's social network.

4. The method of claim 1, wherein said processing comprises automatically processing a payment from said one or more members of the user's social network to the merchant if the queried financial contribution and the identity of the user match a pre-configured member policy.

5. The method of claim 1, wherein said processing comprises processing said money transfer to the merchant from a bank account owned singly by the user and/or each of said one or more members.

6. The method of claim 1, wherein said processing comprises processing said money transfer to the merchant from a bank account owned jointly by the user and one of said one or more members.

7. The method of claim 1, wherein said processing comprises processing said money transfer to the merchant from a subscriber wallet maintained by the telecommunication network operator.

8. The method of claim 1, wherein said processing comprises processing a payment authorization to the merchant from a credit card company in connection with an account of the user and/or an account of one of said one or more members.

9. The method of claim 1, comprising determining a collection of members of the user's social network.

10. The method of claim 1, comprising determining said order in which to contact the one or more members of a user's social network to query for a financial contribution.

11. The method of claim 10, wherein said determining an order comprises determining a descending order of the one or more members based on each member's likelihood of agreeing to the financial contribution.

12. The method of claim 11, wherein the likelihood of a member agreeing to the financial contribution is based on availability of the member to receive a query and/or make a payment.

13. The method of claim 11, wherein the likelihood of a member agreeing to the financial contribution is based on a correlation of a member's presence location with a user's presence location.

14. The method of claim 11, wherein the likelihood of a member agreeing to the financial contribution is based on historical information about at least one past transaction.

15. The method of claim 1, comprising providing a software agent to mediate the transaction between the user, the one or more members of the user's social network, and the merchant.

16. An article of manufacture comprising a non-transitory computer readable storage medium having computer readable instructions tangibly embodied thereon which, when implemented, cause a computer to carry out a plurality of method steps comprising:

presenting an interface on a mobile device of a user, upon receiving a real-time transaction order for a good and/or a service from a merchant point-of-sale terminal, a set of multiple payment method options comprising (i) use of a bank account accessed via a first financial institution server, (ii) use of a credit card account accessed via a second financial institution server, and (iii) use of a mobile wallet provided by a telecommunication network operator module;

in response to a user selection of the payment method option of the use of a mobile wallet provided by the telecommunication network operator module, implementing a payment mediator linked to (i) the mobile device of the user, (ii) the merchant point-of-sale terminal, (iii) the first financial institution server, (iv) the second financial institution server, (v) the telecommunication network operator module, and (vi) a social network server associated with a user's social network, for:

determining one or more members of the user's social network to query for a financial contribution towards payment of the real-time transaction order between the user and a merchant;

managing querying of said one or more members (i) in an order based on descending likelihood of member financial contribution above a given threshold and (ii) in accordance with one or more policy configurations attributed to each respective member, wherein said one or more policy configurations comprise (a) querying a given one of said one or more members if an amount of the financial contribution requested is above a predetermined amount and (b) skipping said querying and automatically initiating a money transfer from the given one of said one or more members if the amount of the financial contribution requested is equal to or below the predetermined amount, and wherein said querying comprises querying until sufficient funds for said payment of the transaction are received or all of said one or more members have been queried, and wherein said likelihood of member financial contribution is based on (i) a history of one or more past payments from said one or more members made upon past social network-based queries for the financial contribution towards payment of the real-time transaction between the user and the merchant and (ii) a determination as to whether a financial balance associated with each of said one or more members is sufficient to allow a positive response to said querying; and processing a money transfer from the user and/or each of said one or more members to the merchant to complete the real-time transaction, wherein said processing is carried out by the telecommunication network operator module, and wherein:

said processing comprises configuring the telecommunication network operator module to mediate the money transfer by providing data communication services to (i) the user, (ii) each of said one or more members, (iii) a financial institution associated with each of the user and said one or more members, and (iv) the merchant; and the telecommunication network operator module employs multiple mobile wallets to be used as sources for the money transfer, wherein the multiple mobile wallets comprise a mobile wallet associated with the user and a mobile wallet associated with each of said one or more members via:

identifying the mobile wallet associated with the user and the mobile wallet associated with said one or more members; and executing a wallet-to-wallet transfer between the mobile wallet associated with the user and the mobile wallet associated with each of said one or more members.

17. A system for executing an electronic payment with collaboration from a social network, comprising:

a memory; and at least one processor coupled to the memory and operative for:

presenting an interface on a mobile device of a user, upon receiving a real-time transaction order for a good and/or a service from a merchant point-of-sale terminal, a set of multiple payment method options comprising (i) use of a bank account accessed via a first financial institution server, (ii) use of a credit card account accessed via a second financial institution server, and (iii) use of a mobile wallet provided by a telecommunication network operator module;

in response to a user selection of the payment method option of the use of a mobile wallet provided by the telecommunication network operator module, implementing a payment mediator linked to (i) the mobile device of the user, (ii) the merchant point-of-sale terminal, (iii) the first financial institution server, (iv) the second financial institution server, (v) the telecommunication network operator module, and (vi) a social network server associated with a user's social network, for:

determining one or more members of the user's social network to query for a financial contribution towards payment of the real-time transaction order between the user and a merchant;

managing querying of said one or more members (i) in an order based on descending likelihood of member financial contribution above a given threshold and (ii) in accordance with one or more policy configurations attributed to each respective member, wherein said one or more policy configurations comprise (a) querying a given one of said one or more members if an amount of the financial contribution requested is above a predetermined amount and (b) skipping said querying and automatically initiating a money transfer from the given one of said one or more members if the amount of the financial contribution requested is equal to or below the predetermined amount, and wherein said querying comprises querying until sufficient funds for said payment of the transaction are received or all of said one or more members have been queried, and wherein said likelihood of member financial contribution is based on (i) a history of one or more past payments from said one or more members made upon past social network-based queries for the financial contribution towards payment of the real-time transaction between the user and the merchant and (ii) a determination as to whether a financial balance associated with each of said one or more members is sufficient to allow a positive response to said querying; and processing a money transfer from the user and/or each of said one or more members to the merchant to complete the real-time transaction, wherein said processing is carried out by the telecommunication network operator module, and wherein:

said processing comprises configuring the telecommunication network operator module to mediate the money transfer by providing data communication services to (i) the user, (ii) each of said one or more members, (iii) a financial institution associated with each of the user and said one or more members, and (iv) the merchant; and the telecommunication network operator module employs multiple mobile wallets to be used as sources for the money transfer, wherein the multiple mobile wallets comprise a mobile wallet associated with the user and a mobile wallet associated with each of said one or more members via:

identifying the mobile wallet associated with the user and the mobile wallet associated with said one or more members; and executing a wallet-to-wallet transfer between the mobile wallet associated with the user and the mobile wallet associated with each of said one or more members.

18. A method for executing an electronic payment with collaboration from a social network, the method comprising the following steps:

presenting an interface on a mobile device of a user, upon receiving a real-time transaction order for a good and/or a service from a merchant point-of-sale terminal, a set of multiple payment method options comprising (i) use of a bank account accessed via a first financial institution server, (ii) use of a credit card account accessed via a second financial institution server, and (iii) use of a mobile wallet provided by a telecommunication network operator module;

in response to a user selection of the payment method option of the use of a mobile wallet provided by the telecommunication network operator module, implementing a payment mediator linked to (i) the mobile device of the user, (ii) the merchant point-of-sale terminal, (iii) the first financial institution server, (iv) the second financial institution server, (v) the telecommunication network operator module, and (vi) a social network server associated with a user's social network, for:

identifying a list of members of the user's social network;

determining one or more members from the list of members to query for a financial contribution towards payment of the real-time transaction order between the user and a merchant;

determining an order in which to contact the one or more members of a user's social network to query for a financial contribution based on each member's likelihood of agreeing to the financial contribution, wherein said likelihood is based on (i) a history of one or more past payments from said one or more members made upon past social network-based queries for the financial contribution towards payment of the real-time transaction between the user and the merchant and (ii) a determination as to whether a financial balance associated with each of said one or more members is sufficient to allow a positive response to said querying;

managing querying of said one or more members (i) in said order and (ii) in accordance with one or more policy configurations attributed to each respective member, wherein said one or more policy configurations comprise (a) querying a given one of said one or more members if an amount of the financial contribution requested is above a predetermined amount and (b) skipping said querying and automatically initiating a money transfer from the given one of said one or more members if the amount of the financial contribution requested is equal to or below the predetermined amount, until sufficient funds for said payment of the transaction are received or all of said one or more members have been queried; and processing a money transfer from the user and/or each of said one or more members to the merchant to complete the real-time transaction, wherein said processing is carried out by the telecommunication network operator module, and wherein:

said processing comprises configuring the telecommunication network operator module to mediate the money transfer by providing data communication services to (i) the user, (ii) each of said one or more members, (iii) a financial institution associated with each of the user and said one or more members, and (iv) the merchant; and the telecommunication network operator module employs multiple mobile wallets to be used as sources for the money transfer, wherein the multiple mobile wallets comprise a mobile wallet associated with the user and a mobile wallet associated with each of said one or more members via:
- identifying the mobile wallet associated with the user and the mobile wallet associated with said one or more members; and
- executing a wallet-to-wallet transfer between the mobile wallet associated with the user and the mobile wallet associated with each of said one or more members;

wherein each of the steps is carried out by a computer device.

* * * * *